United States Patent [19]

Dixon et al.

[11] 4,108,259

[45] Aug. 22, 1978

[54] RAISE DRILL WITH REMOVABLE STEM

[75] Inventors: Robert L. Dixon, Brea; Malcolm D. Maxsted, Harbor City, both of Calif.

[73] Assignee: Smith International, Inc., Newport Beach, Calif.

[21] Appl. No.: 799,253

[22] Filed: May 23, 1977

[51] Int. Cl.² .............................................. E21B 9/24
[52] U.S. Cl. ...................................... 175/344; 175/53; 403/369
[58] Field of Search ................. 175/53, 344, 345, 346, 175/347, 412, 295, 406; 403/369, 370, 374

[56] References Cited

U.S. PATENT DOCUMENTS

| | | | |
|---|---|---|---|
| 1,944,076 | 1/1934 | Giesey | 175/345 |
| 3,835,944 | 9/1974 | Bingham | 175/347 |
| 3,917,009 | 11/1975 | Dyer et al. | 175/53 |
| 3,993,147 | 11/1976 | Mitchell | 175/53 |
| 4,019,824 | 4/1977 | Percy | 403/374 |

*Primary Examiner*—Ernest R. Purser
*Assistant Examiner*—Richard E. Favreau

*Attorney, Agent, or Firm*—Robert M. Vargo

[57] ABSTRACT

A raise drill for enlarging a pilot hole into a larger diameter hole by disintegrating the earth formations surrounding the pilot hole is disclosed. The raise drill includes a main bit body having a plurality of cutters mounted thereon. The bit body is detachably secured to the drive stem to permit removal and replacement of the stem. The removable drive stem allows the raise bit to be transported through small drifts and helps extend the useful life of the raise bit. The drive stem extends through a central opening in the raise bit body and includes an upwardly facing shoulder for engaging the margin of the bit body about the opening. The drive stem further includes a plurality of tapered flat surfaces located about the periphery of the bottom end thereof. A plurality of bolted wedge blocks, attachable to the main bit body are provided to engage the tapered flat surfaces of the drive stem in order to urge the shoulder of the drive stem into locking engagement with the main bit body.

7 Claims, 2 Drawing Figures

RAISE DRILL WITH REMOVABLE STEM

BACKGROUND OF THE INVENTION

1. Field of the Invention

The present invention relates to raise-type earth boring drills, and more particularly to such raise drills in which the drive stem is removably attached to the raise bit body.

2. Description of the Prior Art

A relatively large diameter hole may be provided between two locations in a mine by an operation commonly referred to as raise drilling. A raise drilling operation begins by drilling a small diameter pilot hole through the earth between the locations using a small diameter pilot bit. After the pilot hole is completed, the pilot bit is removed from the drill column and a large diameter raise bit is attached. The raise bit is then rotated and drawn along the pilot hole to enable the drill cutters to contact and disintegrate the earth formations surrounding the pilot hole, thereby enlarging the pilot hole to the desired size. In an exemplary embodiment, the pilot hole may be 11 inches in diameter and the reamed out hole may be 6 feet in diameter.

During a raise drilling operation, a tremendous amount of wear and stress is imposed upon the raise bit. The drive stem in particular is subjected to considerable wear due to abrasive contact with the surrounding earth formation and is also subject to considerable stress resulting from (a) tension due to the pulling force imparted to the drill, (b) twisting due to the torque applied to the drill, and (c) bending due to uneven loading around the circumference of the drill.

The advantages of having the drive stem removable are that the elements having a relatively short lifespan can be replaced, thereby extending the useful life of the bit, and the low profile of the separated components allows the raise bit to be transported through small drifts or passages.

Various problems have been encountered in utilizing prior art raise bits having removable stems. Quite often, special torquing tools are required to disassemble and remove the drive stem from the raise bit body. Such tools are not always readily available in the mining tunnels where the equipment is being used.

In many prior art devices, the torsional forces are transmitted through conical or circular collars which is less positive than desired.

Many prior art devices also do not provide for proper alignment of the stem attachment. As a result serious bending stresses can be encountered due to misalignment of the drive stem with the raise bit body.

SUMMARY OF THE INVENTION

The present invention obviates the above-mentioned shortcomings by providing a novel drive stem attachment for a raise drill that is readily removable without the use of specially designed torquing tools; provides for proper alignment; and transmits torque more positively.

In its broadest aspect, the present invention pertains to a raise drill bit having a main bit body supporting a plurality of roller cutters. The bit body includes a central opening for receiving the drive stem. An upwardly facing peripheral shoulder is formed on the drive stem for engaging the margin of the bit body about the opening. A plurality of tapered flat surfaces are located on the periphery of the bottom end of the drive stem. A plurality of wedge blocks, attachable to the raise bit body, are provided to engage the tapered flat surfaces of the drive stem in order to urge the shoulder of the drive stem into locking engagement with the raise bit body.

The features of the present invention, which are believed to be novel, are set forth with particularity in the appended claims. The present invention, both as to its organization and manner of operation, together with the further advantages thereof, may best be understood by reference to the following description taken in connection with the accompanying drawings.

DESCRIPTION OF THE PREFERRED EMBODIMENT

Figure 1:
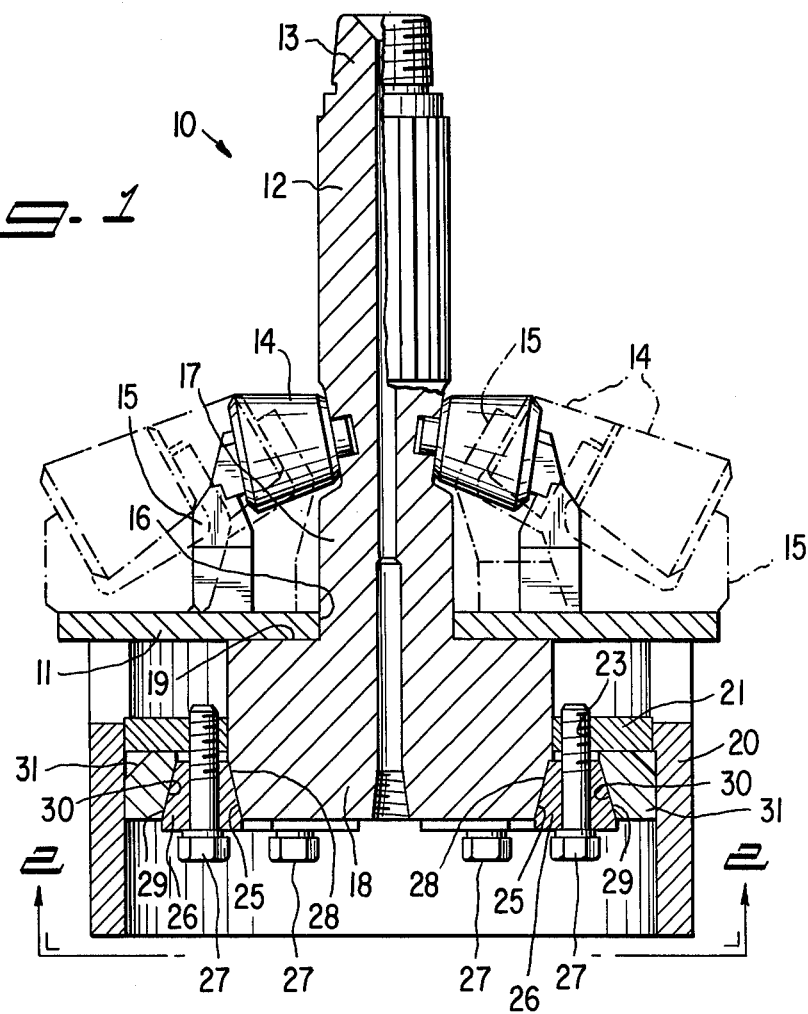
FIG. 1 is a sectional view of a raise bit having a detachable drive stem in accordance with the present invention.
Figure 2:
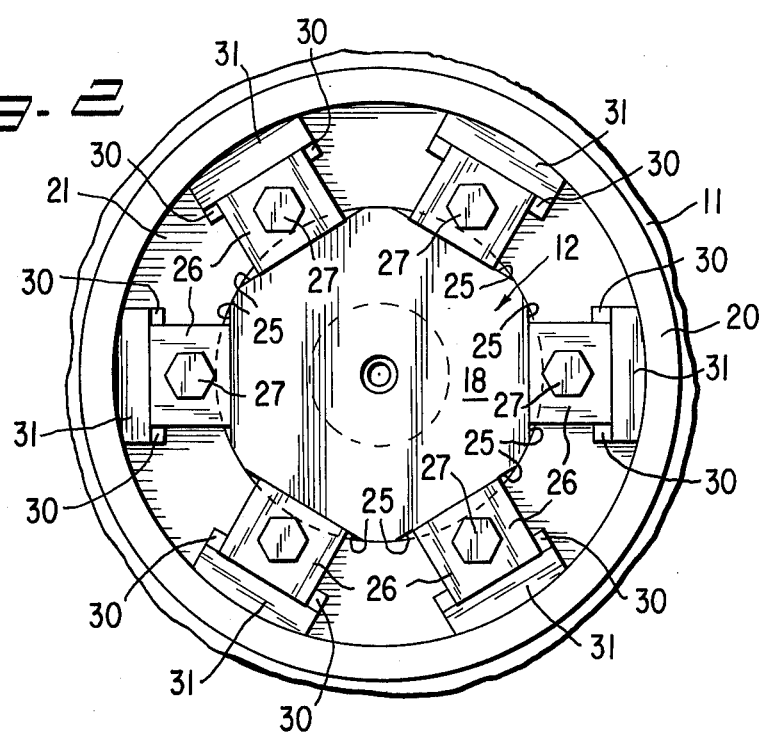
FIG. 2 is a fragmentary bottom plan view of the attachment assembly as seen in the direction of arrows 2 — 2 on FIG. 1.

Referring now to the drawings, FIGS. 1 and 2 illustrate a raise drill bit generally indicated by arrow 10, which includes a main bit body 11 and a drive stem 12. The upper portion of the drive stem 12 is adapted to be connected to a rotary drill column by a threaded connection 13. A plurality of roller cutters 14 are rotatively mounted on a corresponding plurality of yokes 15 which, in turn, are mounted on the raise bit body 11.

The raise bit 10 is utilized in a raise drilling operation to provide a relatively large diameter hole between two levels in a mine. The raise drilling operation begins by drilling a small diameter pilot hole through the earth from a first location to an opening at a second location, using a small diameter pilot bit. After the pilot hole is completed, the pilot bit is removed from the drill column and the raise bit 10 is attached to the drill collar. The raise bit 10 is rotated and drawn along the pilot hole to enable the cutters 14 to contact and disintegrate the earth formations surrounding the pilot hole thereby enlarging the pilot hole to the desired size.

The raise bit body 11 includes a central opening 16 which has a diameter only slightly larger than the central shank portion 17 of the drive stem 12. The central shank portion 17 is of a smaller diameter than the lower shank portion 18 of the drive stem 12, thereby forming an upwardly facing peripheral shoulder 19. The margin of the hole 16 in the bit body 11 fits against the shoulder 19 when the raise bit body 11 is in the assembled position with the drive stem 12.

A cylindrical collar 20 extends below the raise bit body 11 and is attached thereto. An annular plate 21 is located inside the collar 20 and is attached to the interior walls thereof. The annular plate 21 includes a central opening 22 which extends about the lower shank portion 18 of the drive stem 12. The annular plate 21 further includes a plurality of threaded bores 23 circumferentially positioned about the central opening 22. The lower shank portion 18 further includes a plurality of tapered flat surfaces 25 located about the periphery of the bottom end thereof.

A plurality of wedge blocks 26 are provided with each wedge block 26 having a bore extending therethrough for receiving a threaded bolt 27. The bolts 27 are adapted to be attached to the threaded bores 23 located on the annular plate 21. Each wedge block 26 further includes a first inwardly facing tapered surface 28 for engagement with a respective flat surface 25 of the drill stem 12. Each wedge block 26 further includes a second outwardly facing tapered surface 29 diametrically opposed to the first tapered surface 28. The second tapered surface 29 is adapted to engage a tapered surface 30 of a registering block 31, which is positioned within the collar 20 adjacent a respective wedge block 26. The blocks 31 are integrally attached to the collar 20.

OPERATION

The structural details of a raise drill constructed in accordance with the present invention, having been described, a raise drill operation will now be considered utilizing the drill shown in FIGS. 1 and 2.

The raise drilling operation begins by drilling a small diameter pilot hole through the earth from a first location to an opening at a second location using a small diameter pilot bit. After the pilot hole is completed, the pilot bit is removed from the drill column and the raise bit 10 is attached to the drill column. The raise bit 10 is rotated and drawn along the pilot hole with the cutters 14 contacting and disintegrating the earth formations surrounding the pilot hole thereby enlarging the pilot hole to the desired size.

The raise bit may be transported through small drifts or passages by removing the drive stem 12 and transporting the drive stem 12 and the raise bit body 11 through the small drifts or passages separately. In removing the drive stem 12, the bolts 27 are removed utilizing conventional torque tools. A main advantage of the present invention is that if the wedge blocks 26 are frozen, they can be easily tapped to unfreeze the assembly. Upon removal of the bolts 27 and wedge blocks 26, the drill stem 12 is lowered through the central opening 16 out of engagement with the raise bit body 11.

The separate elements of the raise bit 10 may then be transported separately through the small drifts or passages. When the raise bit 10 is to be connected to the drill column, the drive stem 12 is inserted through the central opening 16 of the raise bit body 11, until the shoulder 19 engages the margin of the drive bit body 11 around the central opening 16. The wedge blocks 26 are then positioned as shown in the drawing and the bolts 27 are then threaded into engagement with the plate 21 to urge the wedge blocks 26 into engagement with the flat tapered surfaces 28 of the drive stem 12 and the tapered surfaces 30 of the blocks 31. The bolts 27 are tightened individually to enable the wedge components to be properly aligned. Upon tightening of the bolts 27, the raise bit is again ready for operation.

Another advantage of the present invention is that the shoulder 19 absorbs all of the axial loads passing between the raise bit body 11 and the drive stem 12, while the wedge block connection efficiently and positively transmits all of the torsional load from the drill stem 12 to the raise bit body 11.

Still another advantage of the present invention is that should one of the bolts become loosened the rest of the bolts 27 provide a back-up to ensure that the raise bit body 11 does not become drivingly disconnected with the drive stem 12.

It should be noted that various modifications can be made to the assembly while still remaining within the purview of the following claims.

We claim:

1. A raise drill for enlarging a pilot hole into a larger diameter hole comprising:
    a main bit body having a plurality of cutters rotatively mounted thereon for contacting and disintegrating earth formations surrounding the pilot hole, said main bit body further including a central opening;
    a drive stem having an upper end adapted to extend into the pilot hole, said drive stem further including a central shank portion extending into the central opening of said main bit body, and a lower shank portion of a larger diameter than said central shank portion, thereby forming an upwardly facing peripheral shoulder therebetween, said shoulder engaging the margin of the central opening of said main bit body, said drive stem further including a plurality of tapered flat surfaces located about the periphery of the bottom end of the lower shank portion; and
    locking means secured to said main bit body for engaging said tapered flat surfaces in order to urge the drive stem shoulder upwardly into locking engagement with said main bit body.

2. The combination of claim 1 wherein said locking means includes a plurality of wedge blocks, each block having an inner tapered surface engaging a respective flat surface on said drive stem.

3. The combination of claim 2 wherein said locking means further includes a plurality of bolts, each bolt extending through a respective wedge block with the end of the bolt extending beyond said block adapted for attachment to said main bit body.

4. The combination of claim 3 wherein each of said wedge blocks further includes an outer tapered surface for engagement with a tapered surface attached with said main bit body.

5. A raise drill for enlarging a pilot hole into a large diameter hole comprising:
    a main bit body having a plurality of cutters rotatively mounted thereon for contacting and disintegrating earth formations surrounding the pilot hole, said main bit body further including a central opening;
    a drive stem extending into the central opening of said main bit body and having means for engaging said main bit body, said drive stem further including a plurality of tapered flat surfaces located about the periphery of the bottom end thereof; and
    locking means secured to said main bit body for engaging said tapered flat surfaces in order to urge the drive stem engaging means into locking engagement with said main bit body, said locking means including a plurality of wedge blocks, each block having an inner tapered surface engaging a respective flat surface on said drive stem.

6. The combination of claim 5 wherein said locking means further includes a plurality of bolts, each bolt extending through a respective wedge block with the end of the bolt extending beyond said block adapted for attachment to said main bit body.

7. The combination of claim 6 wherein each of said wedge blocks further includes an outer tapered surface for engagement with a tapered surface attached with said main bit body.

* * * * *